(12) United States Patent
Hayek et al.

(10) Patent No.: US 10,796,300 B2
(45) Date of Patent: Oct. 6, 2020

(54) ASSEMBLY OF CONNECTED TERMINALS FOR PROGRAMMING AND MANAGING A SELECTION OF FUNCTIONS

(71) Applicant: EM Microelectronic-Marin S.A., Marin (CH)

(72) Inventors: Georges Nicolas Hayek, Zurich (CH); Michel Willemin, Preles (CH); Jean-Claude Martin, Montmollin (CH); Thomas Gyger, Les-Ponts-de-Martel (CH)

(73) Assignee: EM Microelectronic-Marin S.A., Marin (CH)

( * ) Notice: Subject to any disclaimer, the term of this patent is extended or adjusted under 35 U.S.C. 154(b) by 322 days.

(21) Appl. No.: 15/557,161

(22) PCT Filed: Mar. 2, 2016

(86) PCT No.: PCT/EP2016/054465
§ 371 (c)(1),
(2) Date: Sep. 11, 2017

(87) PCT Pub. No.: WO2016/142245
PCT Pub. Date: Sep. 15, 2016

(65) Prior Publication Data
US 2018/0047013 A1 Feb. 15, 2018

(30) Foreign Application Priority Data

Mar. 11, 2015 (EP) ..................... 15158715
Mar. 12, 2015 (EP) ..................... 15158872

(51) Int. Cl.
*G06Q 20/34* (2012.01)
*G06Q 20/32* (2012.01)
(Continued)

(52) U.S. Cl.
CPC ....... *G06Q 20/341* (2013.01); *G06Q 20/3278* (2013.01); *G07C 9/00857* (2013.01);
(Continued)

(58) Field of Classification Search
CPC ............ G06Q 20/341; G06Q 20/3278; H04M 1/72563; H04M 1/7253; H04W 4/50;
(Continued)

(56) References Cited

U.S. PATENT DOCUMENTS 7,643,798 B2 * 1/2010 Ljung .................. H04B 5/0037
455/41.3
9,641,662 B2 * 5/2017 Houjou ............... H04M 1/7253
(Continued)

FOREIGN PATENT DOCUMENTS

WO    WO 2014/210183 A2    12/2014

OTHER PUBLICATIONS

International Preliminary Report on Patentability dated Aug. 31, 2017 in PCT/EP2016/054465 (submitting English language translation only).
(Continued)

*Primary Examiner* — Seung H Lee
(74) *Attorney, Agent, or Firm* — Oblon, McClelland, Maier & Neustadt, L.L.P.

(57) ABSTRACT

An assembly includes a main terminal equipped with a communication module using at least a first communications protocol capable of connecting the main terminal to a communication network, which enables the use of at least one function, the main terminal being arranged to use at least one configuration program, and the configuration program enables at least one preferred function to be selected and a code representing the selected preferred function to be generated, and a second communications protocol. The assembly additionally comprises at least one secondary (Continued)

terminal equipped with a passive communication module using the second communications protocol to communicate with the main terminal in order to protect the code representing the selected preferred function.

14 Claims, 4 Drawing Sheets

(51) Int. Cl.
    *H04M 1/725*      (2006.01)
    *G07C 9/00*      (2020.01)
    *H04W 4/80*      (2018.01)
    *H04W 4/50*      (2018.01)
    *G07C 9/20*      (2020.01)

(52) U.S. Cl.
    CPC ..... *H04M 1/7253* (2013.01); *H04M 1/72563* (2013.01); *H04W 4/80* (2018.02); *G07C 9/20* (2020.01); *G07C 2009/00865* (2013.01); *H04W 4/50* (2018.02)

(58) Field of Classification Search
    CPC ................. H04W 4/80; G07C 9/00007; G07C 2009/00865; G07C 9/00857
    See application file for complete search history.

(56) References Cited

U.S. PATENT DOCUMENTS 9,843,618 B2 * 12/2017 Lee ....................... G06F 3/1454
2015/0145653 A1 * 5/2015 Katingari ................ G06F 1/163
                                                          340/12.3
2015/0381793 A1 * 12/2015 Cerda ............... H04M 1/72541
                                                          455/556.1

OTHER PUBLICATIONS

International Search Report dated Apr. 7, 2016 in PCT/EP2016/054465 filed Mar. 2, 2016.

Starwood Preferred Guest, "SPG: Starwood Preferred Guest," retrieved from: https://www.spgpromos.com/keyless/?action=main.faq &language=en_US&IM=SPGKeylessLP, Nov. 2014, XP055208650, 6 pages.

Beiersmann, Stefan, "Bericht: Apple arbeitet an NFC-basierter Zugangskontrolle per iPhone," ZDNet.de, retrieved from: http://www.zdnet.de/88209297/bericht-apple-arbeitet-nfc-basierter-zugangskontrolle-per-iphone/, Oct. 2014, XP055208721, 6 pages.

Boden, Rian, "Starwood Hotels picks Bluetooth for mobile room keys that work on smartphones and Apple Watch," NFC World+, retrieved from: http://www.nfcworld.com/2014/11/03/332389/starwood-hotels-picks-bluetooth-mobile-room-keys-work-smartphones-apple-watch-devices/, Nov. 2014, XP055208703, 3 pages.

Kessler, Jason, "Apple Watch Works with Boarding Passes/Hotel Room Keys/Uber-Fly&Dine," retrieved from: http://flyanddine.boardingarea.com/apple-watch-works-with-boarding-passeshotel-room-keysuber/, Mar. 2015, XP055208719, 6 pages.

"Apple Watch Programming Guide Contents," retrieved from: https://developer.apple.com/library/ios/documentation/General/Conceptual/WatchKitProgrammingGuide/AppleWatchProgrammingGuide.pdf, Mar. 2015, XP055208761, 81 pages.

* cited by examiner

ASSEMBLY OF CONNECTED TERMINALS FOR PROGRAMMING AND MANAGING A SELECTION OF FUNCTIONS

The present invention relates to an assembly comprising a main terminal equipped with a communication module using at least a first and a second communications protocol capable of connecting said main terminal to a communication network, which enables the use of at least one function, wherein said main terminal is arranged to use at least one program for configuration of a secondary terminal.

PRIOR ART

Portable connected devices that allow the operation of several functions are known. One type of portable device used is typically a mobile telephone equipped with a communication module, which in addition to the mobile communication (3G, 4G, LTE . . . ) is capable of using several communications protocols such as the WiFi protocol, Bluetooth protocol or NFC protocol. These mobile telephones can then be used to perform so-called connected functions such as contactless payment, electronic ticketing or contactless access.

However, a disadvantage of this type of operation is that it is necessary for the mobile telephone to be active. In fact, this generally operates on a battery so that if the battery is discharged, the so-called connected functions then become unusable.

Another type of connected device relates to watches used for contactless payment. Such a device consists of a watch, in which an integrated electronic circuit (chip) specific for the payment function is arranged. This payment chip can be provided by the banking institution placed on a support, which is then inserted into a specific slot of the product, or a blank chip is placed directly into the product and then programmed by the banking institution.

Thus, the fact of having a payment chip that is inserted into a slot has the disadvantage of a possible loss of seal, while the fact of having a chip programmed by a banking institution involves significant logistics, since the watch must be sent to the banking institution, thus causing a delay before the buyer can use it.

SUMMARY OF THE INVENTION

The present invention therefore seeks to provide a portable connected device that is simple to program, while always being available.

To this end, the present invention relates to an assembly comprising a main terminal equipped with a communication module using at least a first communications protocol capable of connecting said main terminal to a communication network, which enables the use of at least one function, said main terminal being arranged to use at least one configuration program, wherein the configuration program enables at least one preferred function to be selected and a code representing the selected preferred function to be generated, and a second communications protocol, wherein said assembly further comprises at least one secondary terminal equipped with a passive communication module using the second communications protocol to communicate with said main terminal in order to save the code representing the selected preferred function, and in which said secondary terminal is arranged so that the passive communication module is woken and activated by an external power source coming from another terminal also using the second communications protocol and to send in response to this activation and independently of said main terminal a command to this other terminal so that it performs the preferred function when the secondary terminal is within communication range of this other terminal.

In a first advantageous embodiment, the terminal, with which the secondary terminal communicates, is the main terminal.

In a second advantageous embodiment, the terminal, with which the secondary terminal communicates, is a tertiary terminal equipped with a communication circuit using the second communications protocol.

In a third advantageous embodiment, the terminal, with which the secondary terminal communicates with a secondary terminal is an auxiliary terminal equipped with an active communication circuit using the second communications protocol is used as intermediary.

In a fourth advantageous embodiment the secondary terminal communicates with another secondary terminal, wherein each secondary terminal is equipped with an additional supply circuit for the passive communication module.

In a fifth advantageous embodiment the preferred function is an information display function.

In a sixth advantageous embodiment the preferred function is an application launch function.

In a seventh advantageous embodiment the preferred function is an action launch function (access, door opening . . . ).

In another advantageous embodiment the first communications protocol is a protocol chosen from the list comprising, amongst others, Bluetooth, GSM, EDGE, UMTS, CDMA, LTE, HSPA, xDSL or WiFi protocols.

In another advantageous embodiment the second communications protocol is any protocol capable of being used in a passive communication module.

In another advantageous embodiment the second protocol is the NFC protocol.

In another advantageous embodiment the main terminal comprises display devices and control devices and is a terminal chosen from the following list: mobile telephone or smartphone, computer or laptop, tablet or any device capable of using said configuration program.

In another advantageous embodiment the secondary terminal is a terminal chosen from the list comprising: watch, wristband, jewellery, clip-on pin or other type of wristband.

In another advantageous embodiment the secondary terminal comprises display devices and control devices.

In another advantageous embodiment the terminal performing the preferred function can be any device equipped with a communication circuit using the second protocol, wherein said communication circuit is an internal circuit of said device or an external circuit connected to said device via a wire connection.

In another advantageous embodiment the secondary terminal and the main terminal are of the same type so as to form a single terminal, wherein said single terminal thus comprises a communication module using at least the first protocol and a passive communication circuit using the second communications protocol.

The invention also relates to a method for managing preferred functions of an assembly comprising a main terminal equipped with a communication module using at least a first and a second communications protocol capable of connecting said main terminal to a communication network, which enables the use of at least one function, wherein said main terminal is arranged to use at least one configuration program, said assembly additionally comprising at least one secondary terminal equipped with a passive communication module using the second communications protocol, wherein said method comprises the following steps:

using the main terminal to connect to the communication network via the configuration program;

selecting at least one preferred function via the configuration program;

generating a code representing the selected preferred function;

transferring this code representing the selected preferred function to the memory zone of the communication circuit of the secondary terminal using the communication module of said main terminal.

In an advantageous embodiment, after transfer of the code representing the selected preferred function to the memory zone of the communication circuit of the second terminal, said method additionally comprises the step consisting of sending a command associated with said preferred function, when the secondary terminal is approached by a terminal equipped with a communication circuit using the second protocol, so that the terminal receiving this command can execute the function.

DESCRIPTION OF THE DRAWINGS

Other features and advantages of the invention shall become evident upon reading the following detailed description with reference of the attached drawings, wherein.

DETAILED DESCRIPTION

Figure 1:
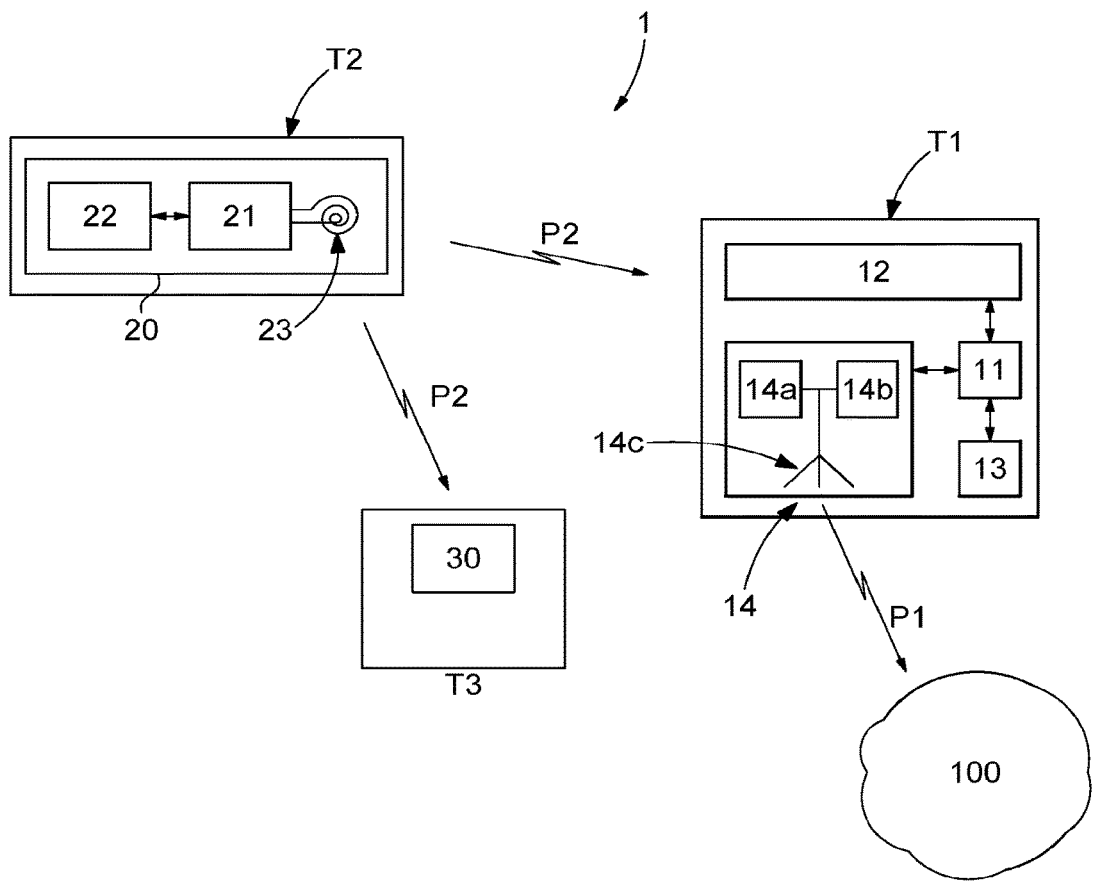
FIGS. 1 and 2 show a schematic view of a first embodiment of the assembly according to the invention.
Figure 2:
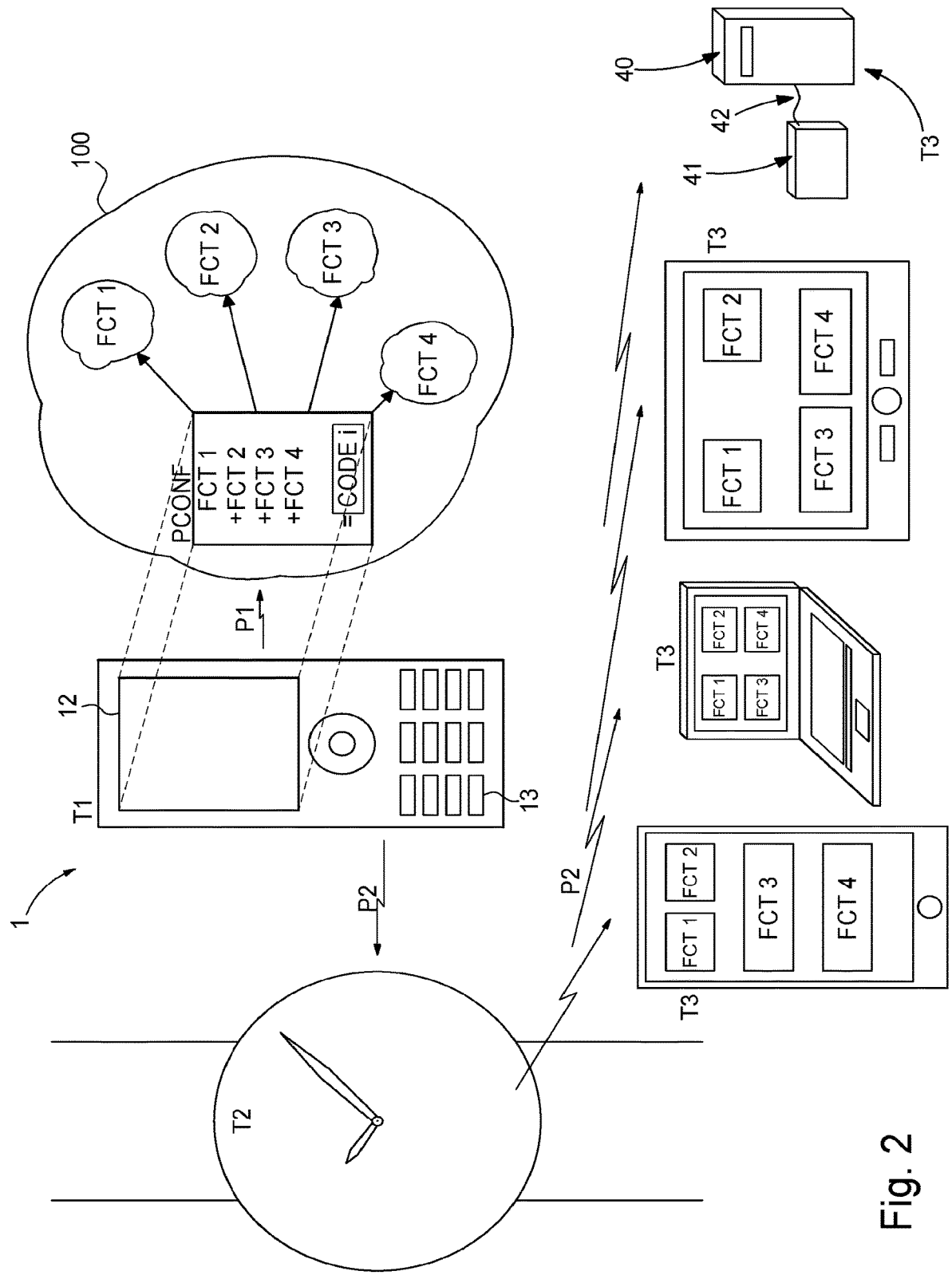

The present invention is shown schematically in FIGS. 1 and 2. Such an assembly 1 firstly comprises a main terminal T1. This main terminal comprises an arithmetic logic unit 11 that manages display devices 12 such as an LCD screen and control devices 13 such as touch or other keys. The arithmetic logic unit 11 is also used to manage a communication module 14.

This communication module 14 comprises a send and receive circuit equipped with at least two separate communication interfaces 14a, 14b and at least one antenna 14c, wherein each interface uses a communications protocol. For example, a first interface 14a will use a first protocol P1 such as Bluetooth, GSM, EDGE, UMTS, CDMA, LTE, HSPA, xDSL or WiFi, whereas the second interface 14b will use a second protocol P2 such as NFC or more generally RFID. Of course, it is possible for the communication module to have another interface using a WiFi type protocol.

This main terminal T1 can be in the form of a mobile telephone or a computer or a touchscreen tablet or other.

The communication module 14 of the main terminal T1 allows access to a communication network 100. Such a network is the internet or an internal network, for example. This communication network 100 allows the user to access a certain number of functions FCTi. One type of function FCTi is an information function. This information function FCTi allows the user to access a large amount of information, i.e. to access specialised pages such as internet sites or thus be capable of retrieving information. FIG. 2 shows that the program PCONF allows access to four functions FCT1, FCT2, FCT3 and FCT4.

There are, of course, other functions FCTi such as e.g. the payment function that allows the user to pay for articles or a configuration function enabling the user to program a configuration such as that of his/her car or that of his/her home or a hotel configuration with personalised access in accordance with the paid formula.

Thus, the main terminal T1 is then arranged to use a configuration program PCONF via the display devices 12 and the control devices 13. Such a configuration program PCONF serves as intermediary between the main terminal T1 and the communication network 100 and can be an application that is installed directly on the main terminal or a program that is implanted directly into the communication network 100. The main terminal is thus a device capable of using said configuration program.

It can be provided that the configuration program PCONF is a single interface for all the functions or a kernel that can be integrated onto different platforms. It could be provided, for example, that the hotel reservation sites or payment sites are equipped with this configuration program. Moreover, it is conceivable that the user can connect via a password or that the connection can be made via an identifier linked to the main terminal T1 or the serial number of said terminal T1 or even the telephone number of the terminal T1 when this is a mobile telephone.

This configuration program PCONF is thus used by the user so that he/she can make a selection. This selection is performed to collect items of information that are important for the user. These items of information can be his/her public transport subscription, weather information, news or sports results or also payment possibilities or functions such as opening a security door or configuration of the device.

Once the selection has been made, the configuration program PCONF compiles these different functions to generate a code CODEi or key representing the selection.

Advantageously, according to the invention the assembly 1 additionally comprises a secondary terminal T2. This secondary terminal T2 comprises at least a communication module 20 equipped with an interface using a protocol capable of allowing a signal to be sent for communication between said secondary terminal T2 and the main terminal T1. The protocol used will preferably be identical to the second protocol P2 used by the second interface 14b of the main terminal T1. This communication module thus comprises a send and receive circuit 21, a memory zone 22 for the storage of information and an antenna 23. The communication module 20 of the secondary terminal, i.e. the emitter-receiver circuit 21, will preferably be passive, i.e. the power necessary for its operation is supplied from outside by the device that communicates with it. Advantageously, as a result of this there are no concerns of any problem of autonomy and it is still able to function even if the secondary terminal T2 suffers a power failure.

The invention advantageously consists of transferring the code or key representing the selection to the memory zone 22 of the communication module 20 of the main terminal T1. This transfer is achieved by a signal using the communications protocol P2 common to the main terminal T1 and the secondary terminal T2.

Thus, when the secondary terminal T2 arrives in communication range with another terminal referred to as tertiary terminal T3 equipped with a communication module 30 fitted with an interface using the same protocol as the secondary terminal, power is applied to the passive communication circuit 20 of the secondary terminal T2. Following this supply of power, the memory zone 22 wakens and can be accessed to enable data relating to the selection to be sent by a signal to the tertiary terminal T3. The secondary terminal T2 is therefore independent of the main terminal T1 since it no longer has need of the main terminal once the code or key representing the selection has been transferred to the memory zone 22 of the communication module 20 of the main terminal T2.

Not all the data are sent, they are sent selectively according to the function and on certain conditions. In fact, certain terminals only have a single function such as payment terminals or electronic ticketing, whereas terminals such as mobile telephones or touchscreen tablets or computers are capable of performing several functions. Hence, the tertiary terminal T3 communicating with the secondary terminal T2 sends an identification code for the function that said tertiary terminal is capable of performing.

In response to an interrogation signal, the secondary terminal T2 sends a control signal ordering the tertiary terminal T3 to perform a compatible function.

If this tertiary terminal is used for electronic ticketing, then the secondary terminal T2 will send the command associated with the electronic ticket or subscription previously purchased and saved.

If this tertiary terminal is used for information, then the secondary terminal T2 sends a command associated with favourite information of the user so that this tertiary terminal T3 will search for said information and display it. This information can included directly in the tertiary terminal T3 such as the time, or even be retrieved via a communication network such as the internet.

If the tertiary terminal is used to configure other devices, then the secondary terminal T2 sends a configuration command so that the tertiary terminal T3 will configure the desired device.

Finally, if this other terminal is used to run applications, then the secondary terminal T2 sends an associated command so that this other terminal will activate the application or applications.

It is, of course, also conceivable that when interrogated the secondary terminal T2 sends all the memorised codes and that the tertiary terminal T3 only activates the associated functions FCTi for those it recognises.

The tertiary terminal T3 could be of the same type as the main terminal T1, i.e. could be in the form of a mobile telephone or a computer or a touchscreen tablet. However, it could also be any device equipped with a communication module 30 using the second protocol P2 or any device 40, to which an external communication circuit 41 is connected via a wire connection 42 such as e.g. a home automation control panel, to which a communication peripheral is connected, for example, via a USB or RS232 or HDMI connection or others.

Figure 3:
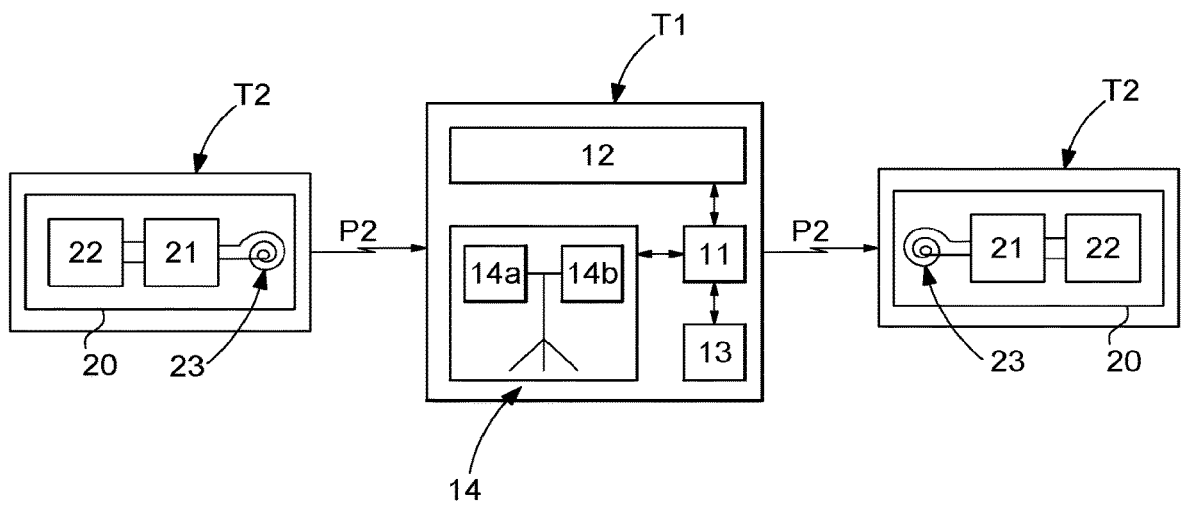
FIG. 3 shows a particular case of the first embodiment of the assembly according to the invention.

It could be provided that the secondary terminal can communicate with a terminal of the same type using another terminal, as can be seen in FIG. 3. In fact, as the secondary terminal T2 is equipped with a passive communication module 20, communication between two second terminals T2 cannot occur directly. For this reason, another terminal such as the main terminal T1 or other terminal using an active communication circuit, i.e. that powers itself, is necessary. An accessory known by the term NFC booster or additional power supply is also usable to temporarily connect two terminals T2 to one another.

In a first embodiment the secondary terminal T2 is a separate device that the user wears permanently.

According to a first solution the secondary terminal is a watch. This watch comprises a case and a watchstrap, wherein the case is fitted with an electronic or mechanical movement and display devices and control devices. The communication module 20 can be integrated into the watchstrap or the case, for example. The communication circuit can, of course, be integrated into the watch glass or the watchstrap buckle.

In an alternative the watch could comprise display devices enabling the desired function to be displayed and selected to send the correct command.

According to a second solution the secondary terminal could be a wristband, a clip-on pin or an item of jewellery such as a necklace or brooch. The necklace could be in the form of a pendant, in which the communication circuit will be arranged, or a chain. In the case of a wristband display devices could be provided, for example, to indicate that the wristband is active.

Figure 4:
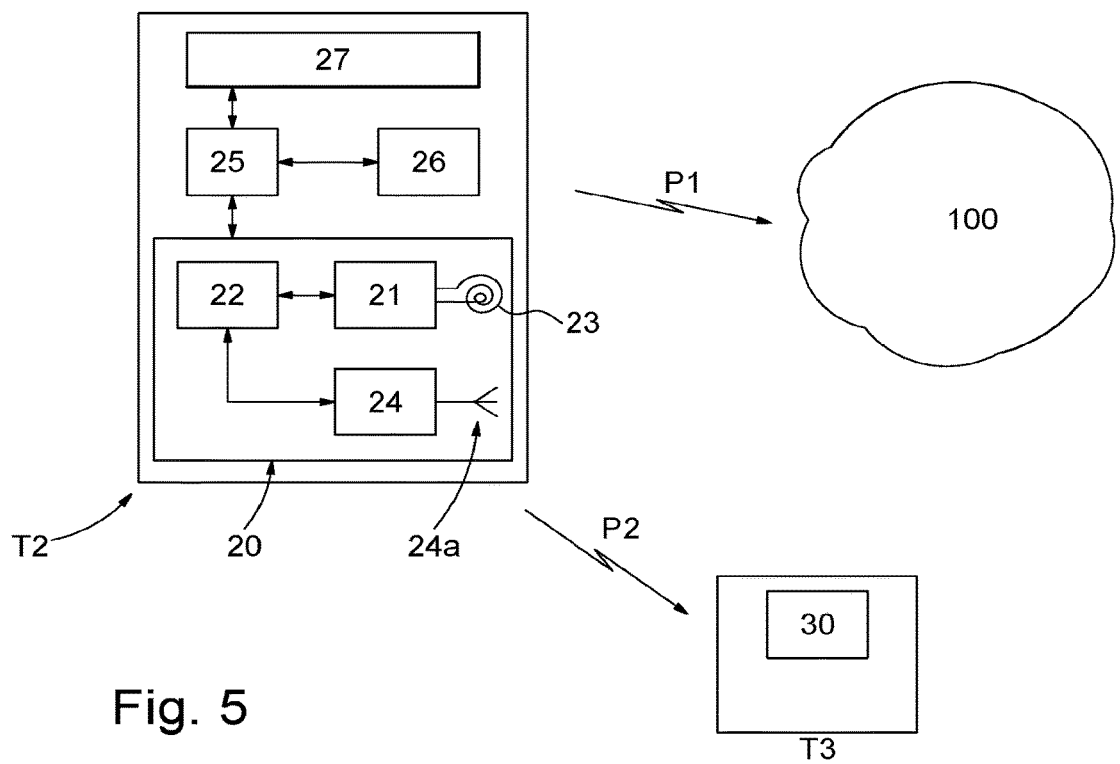
FIGS. 4 and 5 show a schematic view of a second embodiment of the assembly according to the invention.
Figure 5:
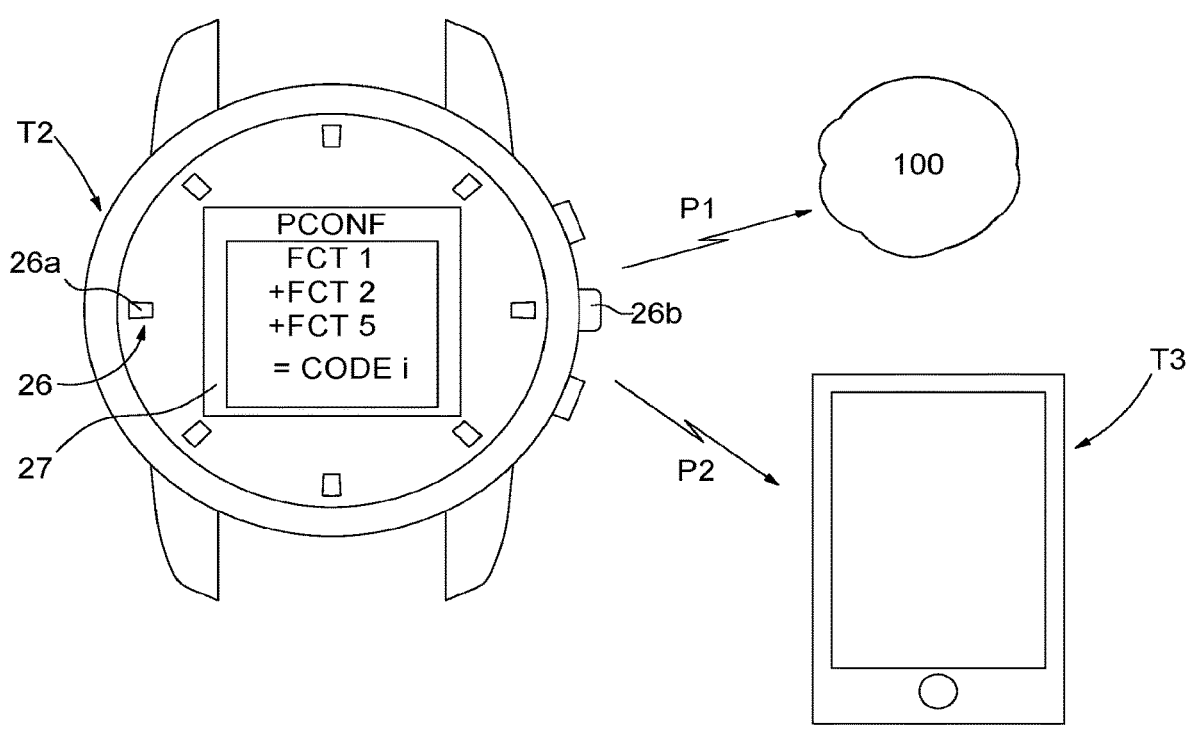

In a second embodiment shown in FIGS. 4 and 5 the main terminal and the secondary terminal are of the same type and form a single terminal. For this, the secondary terminal thus comprises an arithmetic logic unit 25 controlling the display devices 27, control devices 26 and power supply devices. It can be provided that the communication module 20 of the secondary terminal T2 is also equipped with an interface 24 using a communications protocol P1 and an antenna 24a that allows direct access to a communication network 100 via the configuration program PCONF. In FIG. 5, for example, the watch T2 will be equipped with an LCD screen 27, control devices 26 such as touch-sensitive keys 26a and buttons 26b and a GSM or Bluetooth or WiFi module or others to access said communication network. This configuration enables the selection of favourites to be saved directly in the device that the user wears all the time.

Consequently, when the user is in range of another terminal capable of communicating with the passive communication module of the secondary terminal T2, the desired functions FCTi will be able to activate.

Figure 6:
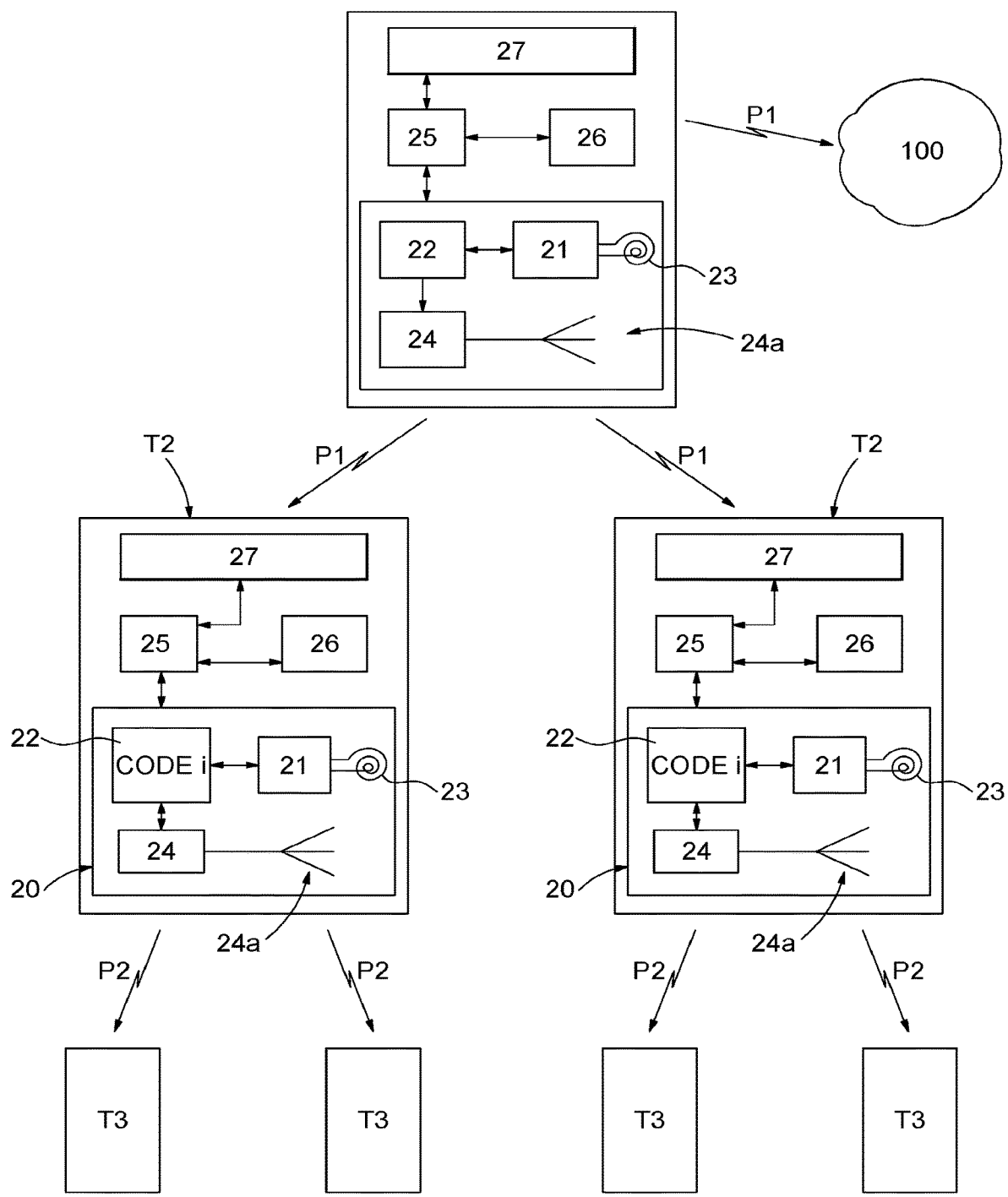
FIG. 6 shows a variant of the second embodiment.

In a variant of this second embodiment shown in FIG. 6, the secondary terminal T2 can be used in a community environment. Therefore, an administrator can use the configuration program via an administration terminal to list the second terminals T2 in communication range according to the first protocol and send each of them a code representing at least one function, wherein this function can be different for each secondary terminal T2 detected. For example, for a hotel application it could be conceivable to award privileges in terms of free access to specific activities or to send promotional material to certain sections of the population such as families or good customers.

In a variant of the different embodiments the secondary terminal T2 is used in a community environment. This secondary terminal T2 can be used as share device. In fact, it can be conceivable to have functions FCTi that allow sharing between users. Such a function FCTi can be linked to sharing privileges such as e.g. the possibility of allowing a function room or a hotel to benefit from the privileged access, or to money or voucher sharing. For example, it is possible to load money or sales vouchers or meal vouchers as credit on the second terminal T2 and to transfer these onto other secondary T2, tertiary T3 or main T1 terminals.

It will be understood that various modifications and/or improvements and/or combinations obvious to a person skilled in the art can be applied to the different embodiments of the invention outlined above without departing from the framework of the invention as defined by the attached claims.

The invention claimed is:

1. An assembly comprising:
a main terminal equipped with a communication module, which includes a first communication interface and a second communication interface, the first communication interface using at least a first communications protocol capable of connecting said main terminal to a communication network for the use of at least one function, said main terminal being arranged to use at least one configuration program, wherein the configuration program enables at least one preferred function to be selected and a code representing the selected preferred function to be generated, and the second communication interface using a second communications protocol, wherein
said assembly further comprises at least one secondary terminal equipped with a passive communication module using the second communications protocol to communicate within communication range with said main terminal in order to save the code representing the selected preferred function, and in which said secondary terminal is arranged so that the passive communication module is woken and activated by a signal coming from the main terminal or a second main terminal equipped with another communication module also using the second communications protocol and to send, in response to this activation, a command to the main terminal or the second main terminal so that the main terminal or the second main terminal performs the preferred function when the secondary terminal is within communication range of the main terminal or the second main terminal.

2. The assembly according to claim 1, wherein the second terminal, with which the secondary terminal is arranged to communicate, is a tertiary terminal equipped with a communication circuit using the second communications protocol in active manner.

3. The assembly according to claim 1, wherein the secondary terminal is arranged to communicate with at least one other secondary terminal, by using an intermediate terminal equipped with an active communication circuit using the second communications protocol.

4. The assembly according to claim 1, wherein the secondary terminal is arranged to communicate with at least one other secondary terminal, wherein each secondary terminal is equipped with an additional supply circuit for the passive communication module.

5. The assembly according to claim 1, wherein the preferred function is an information display function.

6. The assembly according to claim 1, wherein the preferred function is an application or action launch function.

7. The assembly according to claim 1, wherein the first communications protocol is a protocol chosen from the list comprising Bluetooth, GSM, EDGE, UMTS, CDMA, LTE, HSPA, xDSL or WiFi protocols.

8. The assembly according to claim 1, wherein the second communications protocol is a communications protocol capable of being used in a passive communication module.

9. The assembly according to claim 8, wherein the second protocol is the NFC protocol.

10. The assembly according to claim 1, wherein the main terminal comprises display devices and control devices and is a terminal chosen from the following list: mobile telephone, computer, tablet or any device capable of using said configuration program.

11. The assembly according to claim 1, wherein the secondary terminal is a terminal chosen from the list comprising: watch, wristband, jewellery, clip-on pin or other type of wristband.

12. The assembly according to claim 11, wherein the secondary terminal comprises display devices and control devices.

13. The assembly according to claim 1, wherein the terminal performing the preferred function can be any device equipped with a communication circuit using the second protocol, and wherein said communication circuit is an internal circuit of said device or external circuit connected to said device via a wire connection.

14. A method for managing preferred functions of an assembly comprising a main terminal equipped with a communication module, which includes a first communication interface and a second communication interface, the first communication interface using at least a first communications protocol capable of connecting said main terminal to a communication network for the use of at least one function, wherein said main terminal is arranged to use at least one configuration program, the configuration program, and the second communication interface using a second communications protocol, said assembly additionally comprising at least one secondary terminal equipped with a passive communication module using the second communications protocol, wherein said method comprises:
    using the main terminal to connect to the communication network via the configuration program;
    selecting at least one preferred function via the configuration program;
    generating a code representing the selected preferred function;
    transferring this code representing the selected preferred function to a memory zone of the passive communication module of the secondary terminal by using the communication module of said main terminal with the second protocol; and
    once the passive communication module of a second main terminal is woken and activated by a signal coming from the main terminal or the second main terminal equipped with another communication module, sending a command to the main terminal or to the second main terminal so that the main terminal or the second main terminal performs the preferred function when the secondary terminal by using the second protocol is within communication range of the main terminal or the second main terminal.

* * * * *